United States Patent [19]
Long, Jr.

[11] Patent Number: 5,844,711
[45] Date of Patent: Dec. 1, 1998

[54] TUNABLE SPATIAL LIGHT MODULATOR

[75] Inventor: William Harrison Long, Jr., Torrance, Calif.

[73] Assignee: Northrop Grumman Corporation, Los Angeles, Calif.

[21] Appl. No.: 781,883

[22] Filed: Jan. 10, 1997

[51] Int. Cl.⁶ .................................................. G02B 26/00
[52] U.S. Cl. .......................... 359/291; 359/295; 359/318
[58] Field of Search .................................. 359/290, 291, 359/292, 293, 294, 295, 212, 213, 247, 254, 846, 847, 850, 851, 318

[56] References Cited

U.S. PATENT DOCUMENTS

| | | | |
|---|---|---|---|
| 3,629,032 | 12/1971 | Reizman | 360/161 |
| 3,796,480 | 3/1974 | Preston | 350/161 |
| 4,001,635 | 1/1977 | d'Auria et al. | 315/169 R |
| 4,441,791 | 4/1984 | Hornbeck | 350/360 |
| 4,596,992 | 6/1986 | Hornbeck | 346/76 |
| 4,615,595 | 10/1986 | Hornbeck | 353/122 |
| 4,828,368 | 5/1989 | Efron et al. | 350/355 |
| 5,078,479 | 1/1992 | Vuilleumier | 359/290 |
| 5,099,353 | 3/1992 | Hornbeck | 359/291 |
| 5,142,405 | 8/1992 | Hornbeck | 359/226 |
| 5,170,283 | 12/1992 | O'Brien et al. | 359/291 |
| 5,172,262 | 12/1992 | Hornbeck | 359/223 |
| 5,319,214 | 6/1994 | Gregory et al. | 250/504 |
| 5,493,439 | 2/1996 | Engle | 359/292 |

*Primary Examiner*—Georgia Epps
*Assistant Examiner*—Dawn-Marie Bey
*Attorney, Agent, or Firm*—Terry J. Anderson; Karl J. Hoch, Jr.

[57] ABSTRACT

A tunable spatial light modulator for use with a variable wavelength transmitter having a support surface and a plurality of pixels defining an array thereof upon the support surface. Each pixel has a first conductive element formed to the support surface and a second conductive element spaced away from the first conductive element and movable between first and second portions thereof with respect to the first conductive element, the second conductive element configured to reflect light therefrom. The tunable spatial light modulator also has a biasing circuit for applying an electrical bias voltage to the first and second conductive elements, the application of the bias voltage to the first and second conductive elements causing the second conductive element to move with respect t the first conductive element so as to vary a distance between the first and second positions of the second conductive element; and an addressing circuit for selectively addressing individual pixels and for applying a set voltage thereto in addition to the bias voltage so as to cause the second conductive element to move to a desired one of the first and second portions thereof.

7 Claims, 3 Drawing Sheets

TUNABLE SPATIAL LIGHT MODULATOR

FIELD OF THE INVENTION

The present invention relates generally to optics and more particularly to a tunable spatial light modulator for use with a variable wavelength transmitter.

BACKGROUND OF THE INVENTION

Spatial light modulators for modulating coherent light beams, typically laser beams, are well known. Such spatial light modulators are generally divided into two broad categories, reflective and transmissive. Reflective spatial light modulators modulate the laser beam by reflecting only desired portions thereof and not reflecting the remainder of the laser beam, thus providing a binary modulation thereof. Transmissive spatial light modulators transmit selected portions of the laser beam and block the remainder thereof, so as to similarly facilitate binary modulation thereof.

Spatial light modulators of the reflecting type are commonly used for holographic phase modulation, wherein it is desirable to vary the phase of at least a portion of the reflected light by a quarter wavelength, rather than block the light entirely.

In order to accomplish such phase modulation, deformable mirror spatial light modulators are utilized. According to contemporary methodology, a reflective material is deformed via the application of a voltage thereto such that the mirror defined thereby moves by approximately one quarter of the wavelength of the laser being utilized to form a hologram, thus providing the desired interference pattern as a result of such modulation of the laser beam.

However, such contemporary deformable mirror spatial light modulators are specifically configured for a single wavelength of light. Thus, the deformable mirrors thereof only move a preset distance (one quarter wavelength of the laser light being modulated thereby). Thus, when a system having such a contemporary spatial light modulator is to be utilized with a laser having a different wavelength, then the spatial light modulator must be changed so as to accommodate the new laser wavelength. That is, a different spatial light modulator, wherein the deformable mirrors thereof move a preset distance equal to approximately one quarter the wavelength of the new laser, must be utilized. Additionally, such contemporary spatial light modulators cannot be utilized with variable wavelength laser transmitters since they only provide quarter wavelength modulation at a single wavelength.

Thus, contemporary spatial light modulators possess inherent limitations which detract from the overall desirability and utility thereof. As such, it is desirable to provide a spatial light modulator which is tunable such that it may be utilized with a variable wavelength transmitter or with a plurality of laser sources having different wavelengths.

Further, as those skilled in the art will appreciate, contemporary spatial light modulators utilize individual pixel addressing wherein each separate pixel is addressed via a dedicated conductor connected thereto. Such dedicated conductors are typically connected to each individual pixel via through-holes and/or bump contacts. Further, according to the prior art, separate drivers are necessary for each individual pixel. For example, in an N×N array, the number of separate drivers and the number of separate electrical connections between the individual pixels and such dedicated drivers is $N^2$. As those skilled in the art will appreciate, this results in a large number of drivers and interconnections for even a moderately sized pixel array. It also requires that back plane electronics and an interconnect plate be utilized to facilitate such interconnection.

However, the use of such back plane electronics and an interconnect plate prohibit the attachment of a cooling block to the pixel array, and thus undesirably limit the power dissipation capability thereof. As such, it would be desirable to eliminate the requirement for such back plane electronics and interconnect plate, preferably while also simplifying the addressing methodology utilized for activating the pixels of the array. This would permit the attachment of a cooling block, so as to facilitate longer use thereof at higher power levels.

SUMMARY OF THE INVENTION

The present invention specifically addresses and alleviates the above-mentioned deficiencies associated with the prior art. More particularly, the present invention comprises a tunable spatial light modulator for use with a variable wavelength transmitter or with various transmitters of different wavelengths. The tunable spatial light modulator of the present invention comprises a support surface and a plurality of pixels defining an array of deformable or movable mirrors upon the support surface.

Each pixel comprises a first conductive element formed to the support surface and a second conductive element spaced away from the first conductive element and movable between first and second positions thereof with respect to the first conductive element. The first position of the second conductive element is that position thereof wherein the second conductive element is spaced farthest away from the first conductive element and the second position of the second conductive element is that position thereof wherein the second conductive element is positioned closest to the first conductive element. The second conductive element is configured to reflect light therefrom, and thus defines a deformable mirror.

By configuring the tunable spatial light modulator such that the distance between the first and second positions of the second conductive element are approximately equal to one quarter of the wavelength of the laser light being modulated therewith, the tunable spatial light modulator may be tuned to operate with lasers having different wavelengths.

A biasing circuit facilitates the application of an electrical bias voltage to the first and second conductive elements, so as to cause the second conductive element to move with respect to the first conductive element, thus varying a distance between the first and second positions of the second conductive element. As the bias voltage applied to the second conductive element is varied, the second conductive element moves so as to vary the first position thereof. The second position of the second conductive element remains unchanged.

An addressing circuit selectively addresses individual pixels so as to facilitate the application of a set voltage thereto, in addition to the bias voltage, so as to cause the second conductive element to move from the first to the second position thereof.

According to a preferred embodiment of the present invention, each pixel is sequentially addressable via row and column addressing such that only 2N drivers (a row driver for each of N rows and, similarly, a column driver for each of N columns) are required, as opposed to $N^2$ drivers (a separate driver for each of $N^2$ pixels, where there are N rows and N columns), as in the prior art. Such addressing facilitates the elimination of the back plane electronics and the interconnect plate such that a cooling block may be attached to the back of the support surface, so as to facilitate operation of the spatial light modulator of the present invention at increased power levels.

Further, according to the preferred embodiment of the present invention, the array of pixels is defined by a plurality of generally parallel conductive strips defining the first conductive elements disposed generally perpendicular to a plurality of generally parallel conductive ribbons defining the second conductive elements. The conductive ribbons are sufficiently flexible to move when either the bias voltage or the set voltage is applied to a selected conductive strip and a selected conductive ribbon so as to develop a potential therebetween at a desired pixel. The flexible conductive ribbons are supported so as to limit movement thereof substantially to the desired pixel, so as to prevent the undesirable modulation of adjacent pixels. Thus, the conductive ribbons define deformable or movable mirrors. The parallel conductive strips which define the first conductive elements are substantially rigid and do not move appreciably in response to the application of such voltages. As those skilled in the art will appreciate, the conductive strips may be formed by a variety of different methods such as photodeposition, laser etching, etc.

The second position of the second conductive element does not change as the bias voltage is varied because the set voltage (which moves the second conductor to its second position) is sufficient to move the second conductive element to the mechanical limit of its motion. Thus, when the set voltage is applied to a given pixel, the second conductor of that pixel moves as far as it can move, e.g., until it has bottomed out or reached the physical limit of its motion.

Biasing the second conductive element so as to vary the distance between the first and second positions thereof facilitates tuning of the spatial light modulator for use with variable light wavelengths. Row and column addressing facilitates the use of a cooling block so as to increase the power handling capabilities of the spatial light modulator.

These, as well as other advantages of the present invention will be more apparent from the following description and drawings. It is understood that changes in the specific structure shown and described may be made within the scope of the claims without departing from the spirit of the invention.

DETAILED DESCRIPTION OF THE PREFERRED EMBODIMENTS

The detailed description set forth below in connection with the appended drawings is intended as description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The tunable spatial light modulator of the present invention is illustrated in FIGS. 1, 3, and 5–8. FIGS. 2, 4, 9 and 10 illustrate functional characteristics of the present invention.

Figure 1:
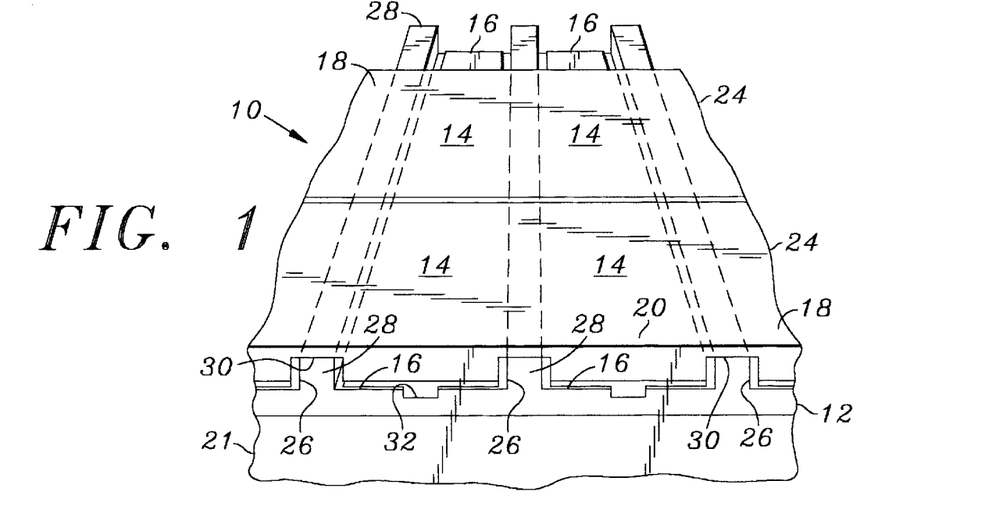
FIG. 1 is a fragmentary perspective view of a portion of an array of pixels of the tunable spatial light modulator according to the present invention.

Referring now to FIG. 1, a first embodiment of the tunable spatial light modulator of the present invention generally comprises a substrate or support surface 12 having a plurality of individual pixels 14 formed thereon. The pixels 14, taken together, define an array 10. Each pixel 14 comprises a first conductive element 16 formed to the support surface 12 and a second conductive element 18 spaced away from the first conductive element 16 and movable between first and second positions thereof with respect to the first conductive element 16. The first conductive elements 16 define the columns of the array and the second conductive elements 18 define the rows of the array. Each second conductive element 18 is configured to reflect light from the upper surface 20 thereof, and thus defines a deformable mirror.

Thus, according to the present invention, the array 10 of pixels 14 is defined by a plurality of generally parallel conductive strips which define the first conductive elements 16 and a plurality of generally parallel conductive ribbons which define the second conductive elements 18. The conductive strips or first conductive elements 16 are disposed generally perpendicular to the conductive ribbons or second conductive elements 18. To form a square pixel array, the same number of first 16 and second 18 conductive elements are utilized.

According to the preferred embodiments of the present invention, the conductive strips or first conductive elements 16 are formed within channels 26 formed in the support surface 12. Upstanding elongate ribs 28 formed intermediate channels 26 support the second conductive elements 18 such that they are spaced apart from the first conductive elements 16. Preferably, grooves 30 formed within the second conductive elements 18 tend to maintain desired positioning thereof upon the ribs 28.

According to the preferred embodiments of the present invention, tabs 32 are formed upon both the first conductive elements 16 and the second conductive elements 18, so as to facilitate electrical connecting thereto. Those skilled in the art will appreciate that various other means of facilitating electrical connection to the first conductive elements 16 and the second conductive elements 18 are likewise suitable.

As those skilled in the art will appreciate, the first conductive elements 16 may be formed within the channels 26 by a variety of different methodologies. For example, the first conductive elements 16 may comprise foil, vapor deposited metalization layers, etc. The first conductive elements 16 may be formed via contemporary photolithographic or laser etching methods. For example, the entire upper surface of the support surface 12 may have a metalization layer formed thereupon and then the metal removed therefrom along the ribs 28 via laser etching.

Optionally, a cooling block 21 is formed to the back or non-reflecting surface of the array 10, so as to facilitate the transfer of heat away from the array 10. The cooling block may comprise a passive heat sink, optionally comprising cooling fins. Alternatively, the cooling block 21 may comprise an active heat pump utilizing convective cooling, such as blown air cooling, water cooling, etc. As a further alternative, the cooling block 21 may comprise a thermoelectric cooler or Peltier device. Those skilled in the art will appreciate that various different methods for removing heat from the back of the array 10 are suitable.

As those skilled in the art will appreciate, applying a voltage to one first conductive element 16 and one second conductive element 18 results in movement of the second conductive element 18 only at the pixel 14 where the first conductive element 16 and the second conductive element 18 intersect. In this manner, any desired pixel 14 can be addressed by applying a voltage across its associated first conductive element 16 and second conductive element 18.

Applying voltages of opposite polarity to one of the first conductive elements 16 and one of the second conductive elements 18 results in the attraction of the second conductive element 18 toward the first conductive element 16 at the pixel 14 where the first conductive element 16 and the second conductive element 18 intersect. Such attraction of the second conductive element 18 toward the first conductive element 16 results in deformation of the mirror defined by the upper surface 20 of the second conductive element 18, thus facilitating use of the array 10 as a reflecting spatial light modulator.

In those applications wherein it is desirable to have the array 10 function as a holographic phase modulator, it is necessary that the mirror defined by the upper surface 20 of each pixel 14 reflect from two positions thereof, wherein the two positions are approximately one quarter wavelength of the reflected light from one another. As those skilled in the art will appreciate, such one quarter wavelength modulation is desirable so as to form interference patterns within the holographic media.

Although it is possible according to the prior art to form such a deformable mirror reflecting spatial light modulator such that the first position of each second conductive element 18 is spaced one quarter wavelength from the second position thereof, i.e., that position wherein the second conductive element 18 contacts or substantially contacts the first conductive element 16, it is only possible to do so for a given wavelength.

As discussed above, it is desirable to provide a tunable spatial light modulator wherein quarter wavelength modulation is possible for different wavelengths. Such functionality necessitates that the distance between the first and second positions of the second conductive element 18 be variable or tunable, for each particular wavelength of laser light incident thereupon. As discussed in detail below, the present invention facilitates such tunability of the spatial light modulator, thereby facilitating its use with different wavelength lasers and/or a variable wavelength transmitter. According to the present invention, the tunable spatial light modulator may be utilized to perform phase modulation, or may otherwise modulate light incident thereon.

Thus, according to the present invention, a binary, reflective phase modulator which uses row and column addressing for a large array of pixels 14 is provided. The pixel separation, i.e., the distance between the first and second positions of the second conductive element 18, is electrically tunable, so as to facilitate read-out or modulation over a broad range of wavelengths. By eliminating the large number of interconnections, vias, etc., associated with conventional addressing, i.e., one conductor per pixel addressing, the back plane electronics are simplified or eliminated and the need for an interconnect plate is eliminated. Such construction facilitates the placement of the cooling block 21 upon the rear surface of the support surface 12, so as to facilitate cooling of the array 10, thereby enabling operation at increased power levels. The reduced complexity of construction also results in reduced production costs and increased scaling potential, i.e., the ability to provide a larger array of pixels 14.

The present invention takes advantage of the non-linear voltage-separation characteristic of an electrostatic, micromachine, deformable mirror, so as to facilitate row and column addressing of a two dimensional array of pixels 14. Thus, according to the present invention, drivers for only 2N pixels 14, rather than $N^2$ pixels 14 are required. That is, individual pixel drivers are not required, according to the present invention. Additionally, the construction of the present invention eliminates the need for through-holes or bump contacts in order to route the drive signal to each individual pixel. Rather, addressing data is strobed onto the array through row and column connections at the edges of the array. Such strobing can be accomplished at a high clock rate.

Basic Operation

The tunable spatial light modulator of the present invention may be tuned for use with different wavelengths of incident light by providing a single variable bias voltage to the whole array.

The attractive force on a parallel plate capacitor of area, A, and separation, s, is:

$$F = \frac{\epsilon_0}{2} \frac{V^2}{s^2} A.$$

Figure 2:
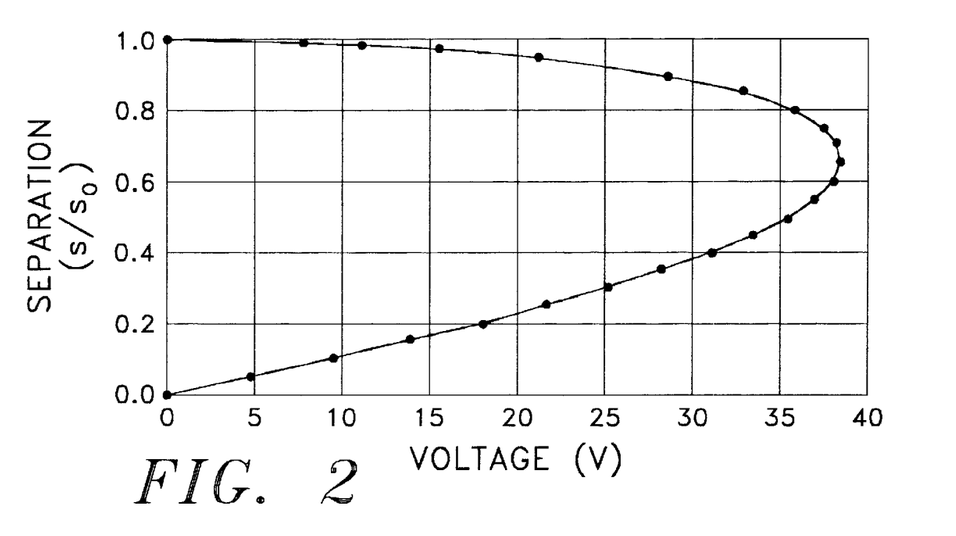
FIG. 2 is a characteristic curve for electrostatic equilibrium according to the present invention.

If the upper plate is deflected from its equilibrium position and has a restoring force proportional to the deflection with a spring constant, k, then the force of attraction and the restoring force will be equal when:

$$V^2 = \frac{2k}{\epsilon_0 A} s^2 (s_0 - s)$$

where $s_0$ is the equilibrium separation. This relationship is plotted in FIG. 2 for:

$$V_0 = \sqrt{\frac{2k s_0^3}{\epsilon_0 A}} = 100\ V.$$

When the applied voltage difference between the two plates exceeds about 38 V, the plates snap together, because the attractive force is everywhere greater than the restoring force. The plates will stay together until the voltage difference is set to zero. In practice there will be some minimum separation, $s_{min}$, set by the thickness of an insulating (or semiconducting) layer, which defines a voltage below which the plates will separate.

The conductive ribbons 24 which define the second conductive elements 18 are formed to be one pixel wide and run the full width of the array 10. The underside of each conductive ribbon or second conductive elements 18 is metalized so as to provide a conductive path for addressing and also so as to facilitate electrostatic attraction to the conductive strips or first conductive elements 16 at the addressed pixel 14.

Preferably, both the conductive strip or first conductive elements 16 and conductive ribbon or second conductive elements 18 have tabs 32 formed upon at least one end thereof, so as to facilitate electrical connection thereto.

Optionally the conductive strips or first conductive elements 16 have a layer of insulation or semiconductor formed thereupon, so as to prevent shorting with the conductive ribbons or second conductive elements 18, if one of the first conductive elements 16 contacts one of the second conductive elements 18 during actuation thereof.

According to the methodology of the present invention, the conductive strip or first conductive elements 16 and conductive ribbon or second conductive elements 18 are initially grounded. Then, a voltage of +20 V is applied to a selected conductive ribbon or second conductive elements 18 and a voltage of −20 V is applied to one conductive strip or first conductive elements 16. The pixel 14 corresponding to the intersection of the first conductive element 16 and the second conductive element 18 to which the voltages are applied is set, i.e., the second conductive element 18 is attracted to the first conductive element 16. That pixel 14 will remain set until the voltage difference between the associated first conductive element 16 and second conductive element 18 is decreased to approximately 0 V.

In order to keep the pixels 14 set, a bias voltage, of approximately −20 V, for example, may be applied to all of the channels simultaneously. Now, with the bias voltage of −20 V applied, a relative voltage pulse of +10 V on the conductive ribbons or second conductive elements 18 and −10 V on the conductive strips or first conductive elements 16, is enough to set the desired pixel. The desired pixel 14 will remain set as long as the bias voltage is maintained. In this manner, any combination of 1's, i.e., set pixels 14, and 0's, i.e., free pixels 14, may be strobed in by setting a particular voltage on each row and pulsing the appropriate column to lock the desired pixels 14 in position.

According to an alternate mode of operation, the pixels 14 are initially set by applying a voltage difference of approximately 40 V to all pixels 14. For example, all of the first conductive elements 16 are biased at −20 V and all of the second conductive elements 18 are biased at approximately +20 V in order to preset or bias the whole array. This bias is then maintained to keep all the pixels 14 set. Now, if a selected conductive ribbon or second conductive elements 18 is pulsed at −10 V and a selected first conductive element 16 is also pulsed at +10 V, then the pixel 14 at the intersection thereof will be released or unset. In this manner, any combination of pixels 14 can be released by applying a signal to the appropriate second conductive element 18 and then strobing the desired first conductive element 16. However, such operation in itself, does not facilitate for tuning of the spatial light modulator, since the second conductive element 18 of each pixel 14 has only two positions, i.e., unset or up and set or down.

Tunable Operation

According to the present invention, it is possible to set the difference between these two positions such that the difference corresponds to one quarter wavelength of the laser light being modulated therewith. And, unlike contemporary devices, that difference can be varied or tuned, as desired. Thus, the spatial light modulator of the present invention may be utilized with light of different wavelengths.

When all of the pixels 14 of the present invention are in a given state, either set or free, the relative separation can be adjusted by applying a predetermined voltage to all of the second conductive elements 18. This voltage is in addition to the constant bias of −20 V.

For example, the minimum voltage difference, below that which all pixels 14 will release, is 10 V. Voltage applied to the conductive ribbons or second conductive elements 18 can be varied between −9 V and 16 V in order to give separations of between 0.88 (88%) and 0.69 (69%) of the full throw, i.e., the maximum difference between the first and second positions of the second conductive elements 18. Thus, if the full throw, $s_0$, is 1.4 µm, then the device is tunable from 3.9 µm to 4.9 µm.

Pixel Flatness and Fill Factor

The upper surfaces 20 of the second conductive elements 18 may be made reflective by plating with a highly reflective material. Those skilled in the art will appreciate that various different methodologies for accomplishing such plating are also suitable. For example, electroplating, vapor deposition, etc. may be utilized.

The fill factor, i.e., the ratio between the reflective surfaces of the pixels 14 and the total surface area of the array 10, is maximized by etching the smallest possible slits between the second conductive elements 18 and by minimizing the width of the supporting ribs 28 therefor.

Pixel flatness is enhanced by utilizing flexure regions or grooves 30 so as to maintain the central portion of each pixel 14 as flat as possible. Far field losses are minimized since each pixel 14 bends only in one dimension.

When utilizing a 200 µm pith, center to center, 10 µm wide ribs and 5 µm flexure regions on each side, the fraction of the pixel area which is deflected and which remains substantially flat can be approximately 90% of the total pixel area.

Electrical and Mechanical Relationships

Two important aspects of the design will now be considered: electrical drive requirements and settling time. The capacitance of each pixel 14 is given by:

$$C = \frac{\epsilon_0 A}{s} .$$

For 200 µm pixels 14 at an equilibrium separation of 1.5 µm, the capacitance is about 0.21 pF (taking the fill factor to be 90%). If the pixel 14 is pulled down to 10% of its equilibrium separation, the capacitance goes up to 2.1 pF. Taking this maximum capacitance time N=128 pixels 14 per row, the capacitance of each ribbon is 0.27 nF. At 40 V, the charge on a ribbon with all pixels 14 set is 11 nC.

To determine the current requirements of the driver, we need to specify the time period for charging each ribbon. This time should be less than or equal to one over twice the resonant frequency of the pixel. The resonant frequency for a mass on a spring is given by:

$$f = \frac{1}{2\pi} \sqrt{\frac{k}{\rho A t}}$$

where $\rho$ is the mass density and t is the thickness of the pixel. Notice that the frequency depends on:

$$\sqrt{\frac{k}{A}}$$

in the same way as the characteristic voltage, $V_0$, defined earlier. So we can write:

$$f = \frac{V_0}{2\pi} \sqrt{\frac{\epsilon_0}{2\rho t s_0^3}}.$$

Taking the density of silicon as 2.33 g/cm$^3$ and the pixel thickness to be 2 $\mu$m, we get f=267 kHz for $V_0$=100 V.

The peak current to charge a full ribbon in half a period at the resonant frequency (2.1 $\mu$s) is:

$$I_{max} = \pi f Q N = 0.4 \sqrt{\frac{\epsilon_0 s_0^3}{2\rho t} \frac{kN}{S_{min}}}$$

which depends on one over the minimum spacing. For the conditions used above the peak current is about 9.2 mA. Using an LC network to transfer the charge, the inductance, L, must be:

$$L = \frac{1}{NC\omega^2} = \frac{\rho t}{\epsilon_0} \frac{s_{min}}{kN}$$

which is about 1.55 mH.

In the expressions above, the spring constant, k, is determined by the modulus of elasticity and by the dimensions of the flexure region. These dimensions must be set to give a high enough resonant frequency while keeping the voltage within acceptable limits. In general, k is proportional to the width of the ribbon, d, so we can see how the parameters above scale with pixel size (assuming square pixels 14). If everything else is held fixed, the dependencies are as follows:

$V_0 \propto d^{-1/2}$
$f \propto d^{-1/2}$
$I_{max} \propto d$
$L \propto d^{-1}$

Extended Tuning Range

The tunable, addressable, binary spatial light modulator of the present invention has a tuning range which is limited by the shape of the voltage-separation characteristic. This relationship is established by balancing the $1/x^2$ Lorentz force with a linear restoring force. The minimum "safe" separation before the plates snap together is about 0.8 times the equilibrium separation. The corresponding tuning range is therefore from 0.8 to 1.0 times the maximum wavelength (e.g., 4 to 5 $\mu$m).

Variable Spring Constant

Figure 4:
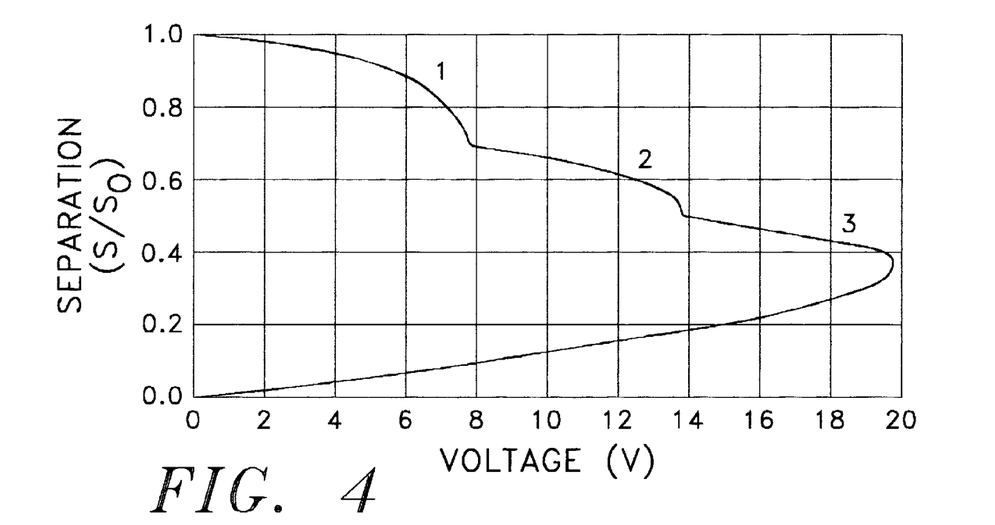
FIG. 4 is a separation-voltage characteristic curve for a second conductive element having three different spring constants.

The tuning range can be extended by introducing a variable spring constant. For example, if the spring constant is increased at the point where the plate separation is 0.8, then the rate of closure with increasing voltage is slowed, and the plate can be pulled down further before collapsing entirely. FIG. 4 shows a case where the spring constant is increased by a factor of 8 at s/s$_0$=0.7 and by an additional factor of 5 at s/s$_0$=0.5. The separation can now be reduced to 0.4 without collapsing. This means the wavelength can be tuned over a range of 0.4 to 1.0 (e.g., 2 to 5 $\mu$m).

Figure 3:
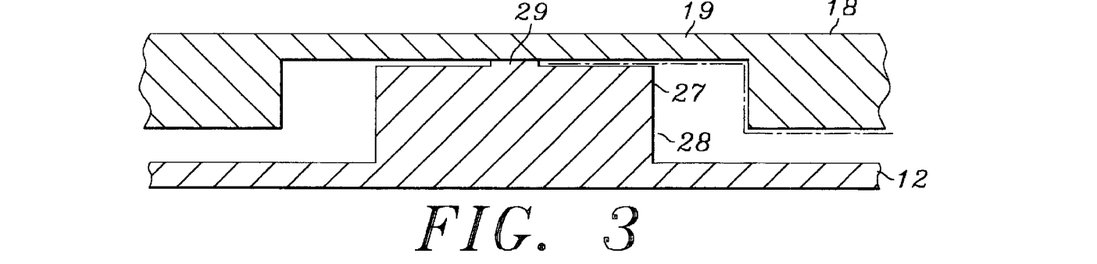
FIG. 3 is a side view of a second embodiment of the tunable spatial light module of the present invention wherein two different spring constants for the bending of the second conductive element are provided via shortening of the attachment arms thereof after bending proceeds past a given point.

The variable spring constant can be implemented by changing the lever arm in the flexure region with steps on the top surface of the ribs. FIG. 3 shows a case where the lever arm is reduced by a factor of 2, which increases the spring constant by a factor of 8. Such an increase in the spring constant occurs when the attachment arm 19 of the second conductive element 18 contacts the edge 27 of the rib 28, thus effectively shortening the lever arm or cantilever of the attachment arm 19 and consequently increasing the spring constant by a factor of eight. As those skilled in the art will appreciate, more steps may be added to give additional tuning range. In the limit of small feature size a nearly continuous height profile could be applied to give a smooth separation versus voltage curve.

Separation versus voltage can be measured in an interferometer and tabulated to provide a look-up table for setting the operating wavelength. The relationship does not have to be linear. In fact, for infrared countermeasure, tuning can be provided in three steps with gaps in between. The steep portions of the tuning curve can be arranged to lie in these gaps.

Variable Electrode Profile

The tuning range can also be extended by using a spatially variable electrode profile to change the shape of the lower portion of the characteristic curve. This can be done by making the bottom electrode non-flat while maintaining it at a uniform potential. Different regions of the pixel 14 will now experience different contributions to the total force, and we can tailor the force-versus-deflection curve to the desired shape.

A simple example of the variable electrode profile is an electrode which has two elevations, the higher elevation having a smaller area than the lower. When the pixel 14 is in its equilibrium position it will experience a force dominated by the larger area, even though it is at a greater distance. As the pixel 14 is deflected, the force due to the higher elevation begins to take over and provide the stronger attractive force. As before, the pixel 14 is pulled down against insulting (or semiconducting) stops and held in place with a bias voltage.

Figure 9:
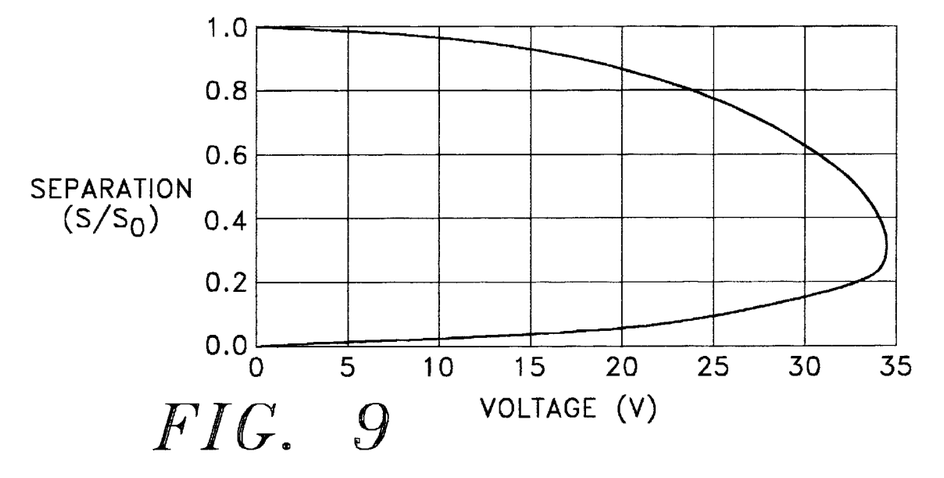
FIG. 9 is a separation-voltage characteristic curve for a two-step second conductive element.

An example of a characteristic curve for a two-level electrode profile is shown in FIG. 9. The high portion of the electrode, which is only 0.25% of the total area, is at s/s$_0$=0, and the lower portion is at s/s$_0$=−2. The set pixels 14 are pulled down to the stops and the unset pixels 14 are pulled down to anywhere between s/s$_0$=1 and s/s$_0$=0.4, to give a tuning range of 2 to 5 $\mu$m, for example. The maximum separation, s$_0$, determines the upper end of the tuning range.

Flexure Regions

Figure 5:
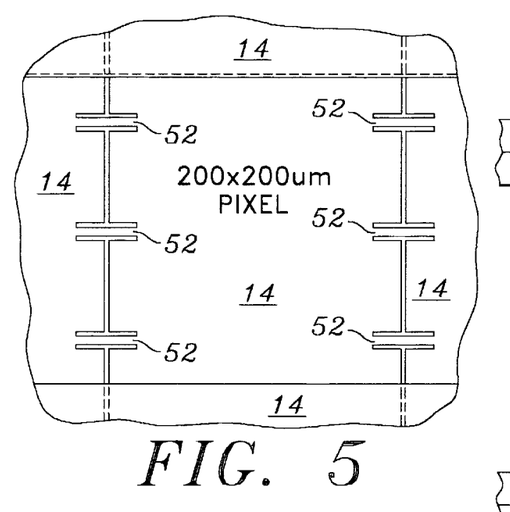
FIG. 5 is a top view of one pixel of a conductive ribbon also showing fragments of surrounding pixels and also showing the interconnecting flexures formed intermediate adjacent pixels of the conductive ribbon.
Figure 6:
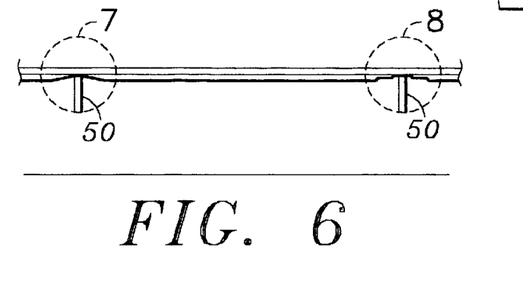
FIG. 6 is a side view of a conductive ribbon showing a constant gradient flexure at the left end thereof and a three stage gradient at the right end thereof.
Figure 7:
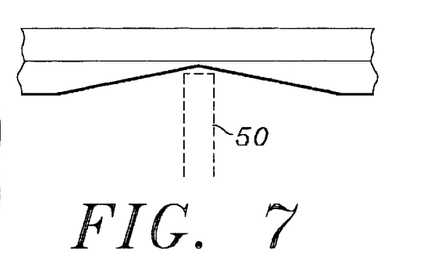
FIG. 7 is an enlarged view, taken along line 7 of FIG. 6, of the constant gradient flexure thereof.
Figure 8:
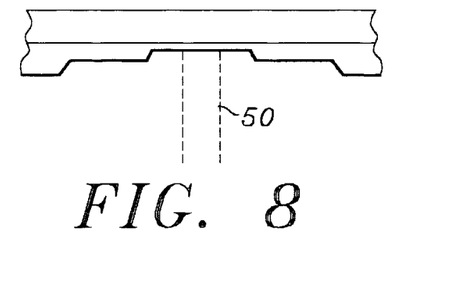
FIG. 8 is an enlarged view, taken along line 8 of FIG. 6, of the three stage gradient flexure thereof.

The ribs can be replaced by a series of posts 50, as shown in FIGS. 6–8, which support the narrow flexures 52 (FIG. 5). The flexures shown here have three degrees of stiffness produced by two steps on either side of the centerline of each post. The area fill factor shown is 95%, but could be increased further if the pixel 14 is made larger with respect to the smallest feature size. The slits are 2 $\mu$m wide, and each pixel 14 is 200 $\mu$m square. The second conductive ribbon elements include portions of reduced thickness to facilitate bending thereof in response to at least one of the bias voltage and the set voltage. In this regard, the movable conductive strips have various thickness within each strip so as to facilitate bending in response to applied voltages.

Pixel Flatness

The purpose of a flexure 52 is to keep the pixel 14 flat, so there is an upper limit to the stiffness of this region beyond which the plate begins to flex. The maximum deflection of a plate with length, l, and thickness, t, simply supported on two edges under a uniform pressure load, p, is:

$$y_{max} = \frac{5pl^4}{32Et^3}(1-v^2)$$

To keep the maximum deflection less than 0.1 μm, a 200×200 μm silicon plate which is 3 μm thick can support a pressure of 1780 Pa(E=1.5×10$^{11}$ Pa and v=0.3). The force per unit area at a separation, s, and voltage, V, is given by:

$$\frac{F}{A} = \frac{\epsilon_0}{2}\frac{V^2}{s^2}$$

For a plate separation of s=0.6 s$_0$=0.84 μm, the voltage corresponding to 1780 Pa is 17 V, and the strong spring constant is k=226N/m. The resonant frequency for the conditions just cited is 49 kHz in the weak spring region (k=28N/m) and 140 kHz in the strong spring region.

Response Time

The time required to set each pixel 14 can be shortened by using the impulse response rather than the steady-state characteristic. The appropriate row and column are pulsed with a voltage sufficient to start the selected pixels 14 moving together. We then move on to pulse the next column without waiting for the pixels 14 in the present column to settle. After the pixel 14 is started in motion, it will continue on well defined path until it is either in a set position or a free position, depending on the voltage impulse it received.

Numerical simulations indicate that with a suitable bias voltage applied to the whole array, individual pixels 14 can be set with a voltage pulse as short as one hundredth of the natural pixel period. This means that the array can be fully set in only a few periods. Some dissipation must be present to damp the resulting oscillations.

Figure 10:
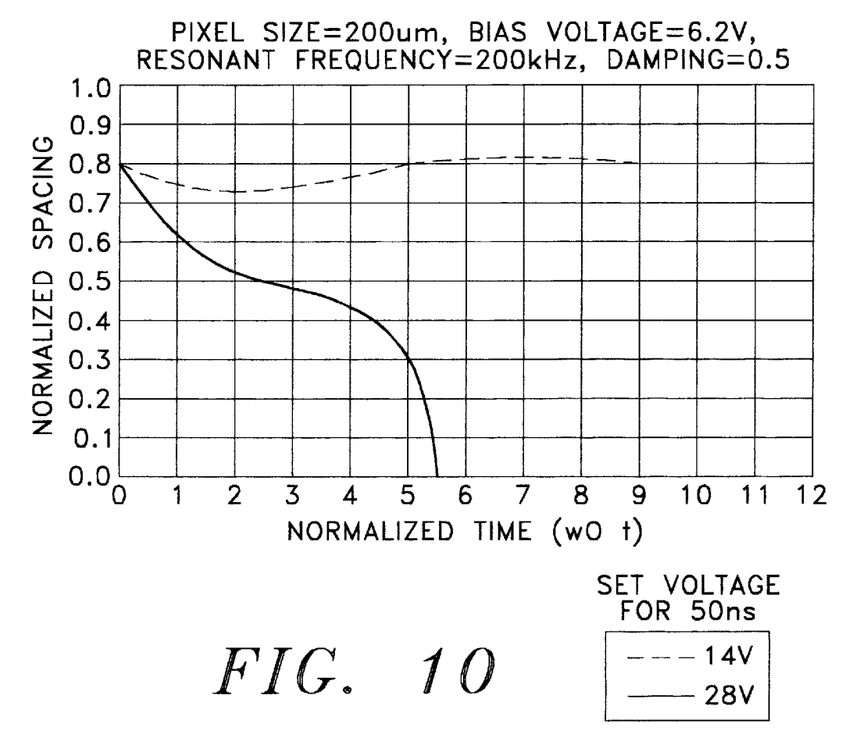
FIG. 10 is a graph showing pixel motion after a set pulse.

Referring now to FIG. 10, a graph of the pixel motion after the set pulse has been sent is shown. The graph illustrates the normalized spacing versus the normalized time and shows both 14 volt and 28 volt set voltages for a 50 nanosecond pulse.

It is understood that the exemplary tunable spatial light modulator described herein and shown in the drawings represents only presently preferred embodiments of the invention. Indeed, various modifications and additions may be made to such embodiments without departing from the spirit and scope of the invention. For example, the pixels need not be generally square in configuration, but rather may be of various different shapes, e.g., hexagonal, octagonal, etc. as they are formed along a given ribbon. Further, those skilled in the art will appreciate that various different means for maintaining the desirable separation of the first and second conductive elements may be utilized.

Thus, these and other modifications and additions may be obvious to those skilled in the art and may be implemented to adapt the present invention for use in a variety of different applications.

What is claimed is:

1. A tunable spatial light modular for use with a variable wavelength transmitter, the tunable spatial light modulator comprising:
   a) a support surface;
   b) a plurality of pixels defining an array thereof upon the support surface, each pixel comprising:
      i) a first conductive element formed to the support surface;
      ii) a second conductive element spaced away from the first conductive element and movable between the first and second positions thereof with respect to the first conductive element, the second conductive element configured to reflect light therefrom;
   c) a biasing circuit for applying an electrical bias voltage to the first and second conductive elements, the application of the bias voltage to the first and second conductive elements causing the second conductive element to move with respect to the first conductive element so as to vary a distance between the first and second positions of the second conductive element;
   d) an addressing circuit for selectively addressing individual pixels and for applying a set voltage thereto in addition to the bias voltage so as to cause the second conductive element to move to a desired one of first and second positions thereof; and
   e) a cooling block formed to a side of the support surface opposite the pixels, the cooling block facilitating operation of the tunable spatial light modulators at enhanced power.

2. A tunable spatial light modulator for use with a variable wavelength transmitter, the tunable spatial light modulator comprising:
   a) a support surface;
   b) a plurality of pixels defining an array thereof upon the support surface, each pixel comprising:
      i) a first conductive element formed to the support surface;
      ii) a second conductive ribbon element spaced away from the first conductive element and movable between first and second positions thereof with respect to the first conductive element, the second conductive ribbon element configured to reflect light therefrom; and
      iii) an upstanding rib formed to the support surface for supporting said second conductive ribbon element proximate said first conductive element wherein said rib is configured to change the lever arm of the second conductive ribbon element and to move said second conductive element toward the first conductive element to vary the spring constant of said second conductive ribbon element to reduce the rate of closure and aid in biasing and increase tuning range;
   c) a biasing circuit for applying an electrical bias voltage to the first and second conductive elements, the application of the bias voltage to the first and second conductive elements causing the second conductive element to move with respect to the first conductive element so as to vary a distance between the first and second positions of the second conductive element; and
   d) an addressing circuit for selectively addressing individual pixels and for applying a set voltage thereto in addition to the bias voltage so as to cause the second conductive element to move to a desired one of the first and second positions thereof.

3. A tunable spatial light modulator for use with a variable wavelength transmitter, the tunable spatial light modulator comprising:

a) a support surface;

b) a plurality of pixels defining an array thereof upon the support surface, each pixel comprising:

i) a first conductive element formed to the support surface;

ii) a second conductive ribbon element having portions of varying thickness to facilitate bending of said ribbon element in response to applied voltage, said second ribbon element spaced away from the first conductive element and movable between first and second positions thereof with respect to the first conductive element, the second ribbon conductive element configured to reflect light therefrom;

c) a biasing circuit for applying an electrical bias voltage to the first and second conductive elements, the application of the bias voltage to the first and second conductive elements causing the second conductive element to move with respect to the first conductive element so as to vary a distance between the first and second positions of the second conductive element; and d) an addressing circuit for selectively addressing individual pixels and for applying a set voltage thereto in addition to the bias voltage so as to cause the second conductive element to move to a desired one of the first and second positions thereof.

4. A tunable spatial light modulator for use with a variable wavelength transmitter, the tunable spatial light modulator comprising:

a) a support surface;

b) a plurality of pixels defining an array thereof upon the support surface, each pixel comprising:

i) a first conductive element formed to the support surface;

ii) a second conductive element comprising at least two discrete sections wherein each section of said second conductive element is spaced at a different distance from said first conductive element such that each section of the second conductive element provides a distinct contribution to a total force upon the second conductive element in response to a substantially uniform voltage applied to the second conductive element, said second conductive element spaced away from the first conductive element and movable between first and second positions thereof with respect to the first conductive element, the second conductive element configured to reflect light therefrom;

c) a biasing circuit for applying an electrical bias voltage to the first and second conductive elements, the application of the bias voltage to the first and second conductive elements causing the second conductive element to move with respect to the first conductive element so as to vary a distance between the first and second positions of the second conductive element; and d) an addressing circuit for selectively addressing individual pixels and for applying a set voltage thereto in addition to the bias voltage so as to cause the second conductive element to move to a desired one of the first and second positions thereof.

5. The tunable spatial light modulator as recited in claim 4 wherein the different sections of the second conductive elements are provided by forming the second conductive elements to varying in thickness in a stairstep-like fashion.

6. The tunable spatial light modulator as recited in claim 4 wherein the different sections of the conductive elements are provided by forming the second conductive elements to varying in thickness in a generally smooth fashion.

7. The tunable spatial light modulator as recited in claim 4 further comprising:

a) a plurality of posts formed upon the support surface for supporting the second conductive elements spaced apart from and proximate to the first conductive elements; and b) wherein said second conductive elements comprise ribbons.

* * * * *